US009828897B2

United States Patent
Alano

(10) Patent No.: US 9,828,897 B2
(45) Date of Patent: *Nov. 28, 2017

(54) MIXER FOR A VEHICLE EXHAUST SYSTEM

(71) Applicant: Faurecia Emissions Control Technologies, USA, LLC, Columbus, IN (US)

(72) Inventor: Eduardo Alano, Columbus, IN (US)

(73) Assignee: Faurecia Emissions Control Technologies USA, LLC, Columbus, IN (US)

( * ) Notice: Subject to any disclaimer, the term of this patent is extended or adjusted under 35 U.S.C. 154(b) by 225 days.

This patent is subject to a terminal disclaimer.

(21) Appl. No.: 14/737,533

(22) Filed: Jun. 12, 2015

(65) Prior Publication Data

US 2016/0319720 A1     Nov. 3, 2016

Related U.S. Application Data

(60) Provisional application No. 62/155,007, filed on Apr. 30, 2015.

(51) Int. Cl.
    *F01N 1/00*    (2006.01)
    *F01N 3/20*    (2006.01)
    *B01D 53/94*   (2006.01)

(52) U.S. Cl.
    CPC ....... *F01N 3/2066* (2013.01); *B01D 53/9431* (2013.01); *B01D 2257/404* (2013.01)

(58) Field of Classification Search
    CPC .............. F01N 3/2066; B01D 53/9431; B01D 2257/404

(Continued)

(56) References Cited

U.S. PATENT DOCUMENTS 7,509,799 B2    3/2009  Amou
8,756,921 B2    6/2014  Troxler et al.
(Continued)

FOREIGN PATENT DOCUMENTS

DE    4417238     3/2003
DE    19806265    7/2004
(Continued)

OTHER PUBLICATIONS

PCT/US2013/051935 application, filed Jul. 25, 2013.
(Continued)

*Primary Examiner* — Jason Shanske
(74) *Attorney, Agent, or Firm* — Barnes & Thornburg LLP

(57) ABSTRACT

A mixer for a vehicle exhaust system includes an upstream baffle with at least one inlet opening configured to receive engine exhaust gas, a downstream baffle with at least one outlet opening configured to conduct engine exhaust gases to a downstream exhaust component, and an outer peripheral wall surrounding the upstream and downstream baffles and defining a mixer central axis. An intermediate plate is positioned between the upstream and downstream baffles to block direct flow from the inlet opening to the outlet opening. The intermediate plate initiates a rotational flow path that directs exhaust gases exiting the inlet opening through a rotation of more than 360 degrees about the mixer central axis before exiting the outlet opening.

18 Claims, 8 Drawing Sheets

(58) Field of Classification Search
USPC .......................................................... 60/324
See application file for complete search history.

(56) References Cited

U.S. PATENT DOCUMENTS

| | | | |
|---|---|---|---|
| 2009/0107126 A1 | 4/2009 | Bugos et al. | |
| 2010/0212292 A1 | 8/2010 | Rusch et al. | |
| 2011/0113764 A1* | 5/2011 | Salanta ................. | F01N 3/2066 60/303 |
| 2012/0216513 A1 | 8/2012 | Greber et al. | |
| 2013/0216442 A1 | 8/2013 | Brunel et al. | |
| 2014/0044603 A1 | 2/2014 | Greber | |
| 2014/0318112 A1 | 10/2014 | Solbrig et al. | |

FOREIGN PATENT DOCUMENTS

| | | |
|---|---|---|
| DE | 10312212 | 9/2006 |
| DE | 102005061145 | 6/2007 |
| DE | 202007010324 | 11/2008 |
| DE | 102007051510 | 4/2009 |
| DE | 102007052262 | 5/2009 |
| DE | 202008001022 | 6/2009 |
| DE | 102008008563 | 8/2009 |
| DE | 102008008564 | 8/2009 |
| DE | 102011077156 | 12/2012 |
| DE | 102008040476 | 4/2013 |
| DE | 10241697 | 5/2016 |
| EP | 0268026 | 8/1993 |
| EP | 1314864 | 1/2007 |
| EP | 2221459 | 8/2010 |
| EP | 2282026 | 2/2011 |
| EP | 2295755 | 3/2011 |
| EP | 2405109 | 1/2012 |
| EP | 2492465 | 8/2012 |
| EP | 2465602 | 11/2013 |
| EP | 2687286 | 1/2014 |
| EP | 2295756 | 3/2014 |
| EP | 2860369 | 4/2015 |
| EP | 2860370 | 4/2015 |
| EP | 2325452 | 5/2015 |
| EP | 2884069 | 6/2015 |
| EP | 2980379 | 2/2016 |
| FR | 2897646 | 8/2008 |
| FR | 2947003 | 6/2009 |
| FR | 2966197 | 10/2010 |
| FR | 2965011 | 3/2012 |
| FR | 2977632 | 1/2013 |
| JP | H2223624 | 2/1989 |
| JP | H0296212 | 4/1990 |
| JP | 2001030093 | 2/2001 |
| JP | 2013002367 | 1/2013 |
| KR | 20110049152 A | 5/2011 |
| SE | 531199 | 1/2009 |
| WO | 9701387 | 1/1997 |
| WO | 2008027146 | 3/2008 |
| WO | 2008034981 | 3/2008 |
| WO | 2009068136 | 6/2009 |
| WO | 2009098096 | 8/2009 |
| WO | 2010078052 | 7/2010 |
| WO | 2011139953 | 11/2011 |
| WO | 2011163395 | 12/2011 |
| WO | 2013099313 | 12/2011 |
| WO | 2012013562 | 2/2012 |
| WO | 2012044233 | 4/2012 |
| WO | 2012047159 | 4/2012 |
| WO | 2012050509 | 4/2012 |
| WO | 2012052560 | 4/2012 |
| WO | 2012053960 | 4/2012 |
| WO | 2012054437 | 4/2012 |
| WO | 2012080585 | 6/2012 |
| WO | 2012096971 | 7/2012 |
| WO | 2012120000 | 9/2012 |
| WO | 2013010700 | 1/2013 |
| WO | 2013035112 | 3/2013 |
| WO | 2013036406 | 3/2013 |
| WO | 2013048309 | 4/2013 |
| WO | 2013099312 | 7/2013 |
| WO | 2013099314 | 7/2013 |
| WO | 2013112154 | 8/2013 |
| WO | 2013178321 | 12/2013 |
| WO | 2014017310 | 1/2014 |
| WO | 2014047091 | 3/2014 |
| WO | 2014051617 A1 | 4/2014 |
| WO | 2014077023 | 5/2014 |
| WO | 2014112063 | 7/2014 |
| WO | 2014112067 | 7/2014 |
| WO | 2014112072 | 7/2014 |
| WO | 2014112073 | 7/2014 |
| WO | 2014115461 | 7/2014 |
| WO | 2014182832 | 11/2014 |
| WO | 2015018971 | 2/2015 |
| WO | 2015020820 | 2/2015 |
| WO | 2015074926 | 5/2015 |
| WO | 2015076765 | 5/2015 |
| WO | 2015130640 | 9/2015 |
| WO | 2015151282 | 10/2015 |
| WO | 2015187128 | 12/2015 |
| WO | 2016013319 | 1/2016 |

OTHER PUBLICATIONS

International Search Report and Written Opinion for International Application No. PCT/US2016/028229 dated Jul. 28, 2016.

* cited by examiner

390 DEG ROTATION

450 DEG ROTATION

MIXER FOR A VEHICLE EXHAUST SYSTEM

CROSS-REFERENCE TO RELATED APPLICATION

This application claims priority to U.S. Provisional Patent Application No. 62/155,007, filed Apr. 30, 2015.

BACKGROUND OF THE INVENTION

An exhaust system conducts hot exhaust gases generated by an engine through various exhaust components to reduce emissions and control noise. The exhaust system includes an injection system that injects a diesel exhaust fluid (DEF) or a reducing agent, such as a solution of urea and water for example, upstream of a selective catalytic reduction (SCR) catalyst. A mixer is positioned upstream of the SCR catalyst and mixes engine exhaust gases and products of urea transformation.

The mixer includes an upstream baffle with an inlet opening and a downstream baffle with an outlet opening, with the upstream and downstream baffles being surrounded by an outer peripheral wall. A doser is mounted at an opening formed within the outer peripheral wall to spray the DEF into the exhaust stream. The spray tends to have a larger droplet size in order to provide a high spray penetration such that the droplets are spread across the entire mixer cross-section. However, smaller droplet sizes are preferred as droplets with smaller diameters evaporate more quickly than larger diameter droplets.

Due to packaging constraints it is important to provide a compact configuration for the mixer by minimizing the length of the mixer. Typically, mixers having a short length also have a large exhaust flow cross-sectional area. This is disadvantageous when using smaller droplet sizes as the droplets tend not to penetrate sufficiently into the exhaust flow. Thus, having the desired shorter mixing length and the desired smaller spray droplet size are at odds with each other. Not only must the droplets have a high spray penetration, the droplets must be distributed evenly.

In one known compact mixer configuration set forth in U.S. Pat. No. 8,661,792, the inlet and outlet openings are orientated relative to each other such that the flow path provides 300 degrees of rotation from the inlet opening to the outlet opening. While this degree of rotation facilitates penetration and distribution, it is desirable to further improve mixing performance without increasing the mixer length.

SUMMARY OF THE INVENTION

In one exemplary embodiment, a mixer for a vehicle exhaust system includes an upstream baffle with at least one inlet opening configured to receive engine exhaust gas, a downstream baffle with at least one outlet opening configured to conduct engine exhaust gases to a downstream exhaust component, and an outer peripheral wall surrounding the upstream and downstream baffles and defining a mixer central axis. An intermediate plate is positioned between the upstream and downstream baffles to block direct flow from the inlet opening to the outlet opening. The intermediate plate initiates a rotational flow path that directs exhaust gases exiting the inlet opening through a rotation of more than 360 degrees about the mixer central axis before exiting the outlet opening.

In a further embodiment of the above, rotation is at least 390 degrees.

In a further embodiment of any of the above, the intermediate plate comprises a wedge-shape having an apex near the mixer central axis and widening radially outward in a direction toward the outer peripheral wall.

In a further embodiment of any of the above, the outer peripheral wall includes a doser opening configured to receive a doser to spray a reducing agent into an area between the upstream baffle and intermediate plate.

In another exemplary embodiment, a vehicle exhaust system comprises a mixer having an upstream baffle with at least one inlet opening configured to receive engine exhaust gas, a downstream baffle with at least one outlet opening configured to conduct engine exhaust gases to a downstream exhaust component, an outer peripheral wall surrounding the upstream and downstream baffles and defining a mixer central axis. A doser is configured to spray a reducing agent into the mixer. The doser defines a central doser axis and is mounted at a doser opening within the outer peripheral wall. An intermediate plate is positioned between the upstream and downstream baffles to block direct flow from the inlet opening to the outlet opening. The intermediate plate initiates a rotational flow path that directs exhaust gases exiting the inlet opening through a rotation of more than 360 degrees about the mixer central axis before exiting the outlet opening.

In a further embodiment of any of the above, the at least one inlet opening comprises a plurality of inlet openings that includes a primary inlet opening that is larger than the remaining inlet openings such that a majority of the engine exhaust gases flow through the primary inlet opening, and wherein the at least one outlet opening comprises a plurality of outlet openings that includes one primary outlet opening that is larger than the other outlet openings, and wherein the intermediate plate is positioned axially between the primary inlet opening and primary outlet opening.

In a further embodiment of any of the above, the central doser axis does not intersect the central mixer axis.

These and other features of this application will be best understood from the following specification and drawings, the following of which is a brief description.

DETAILED DESCRIPTION

Figure 1:
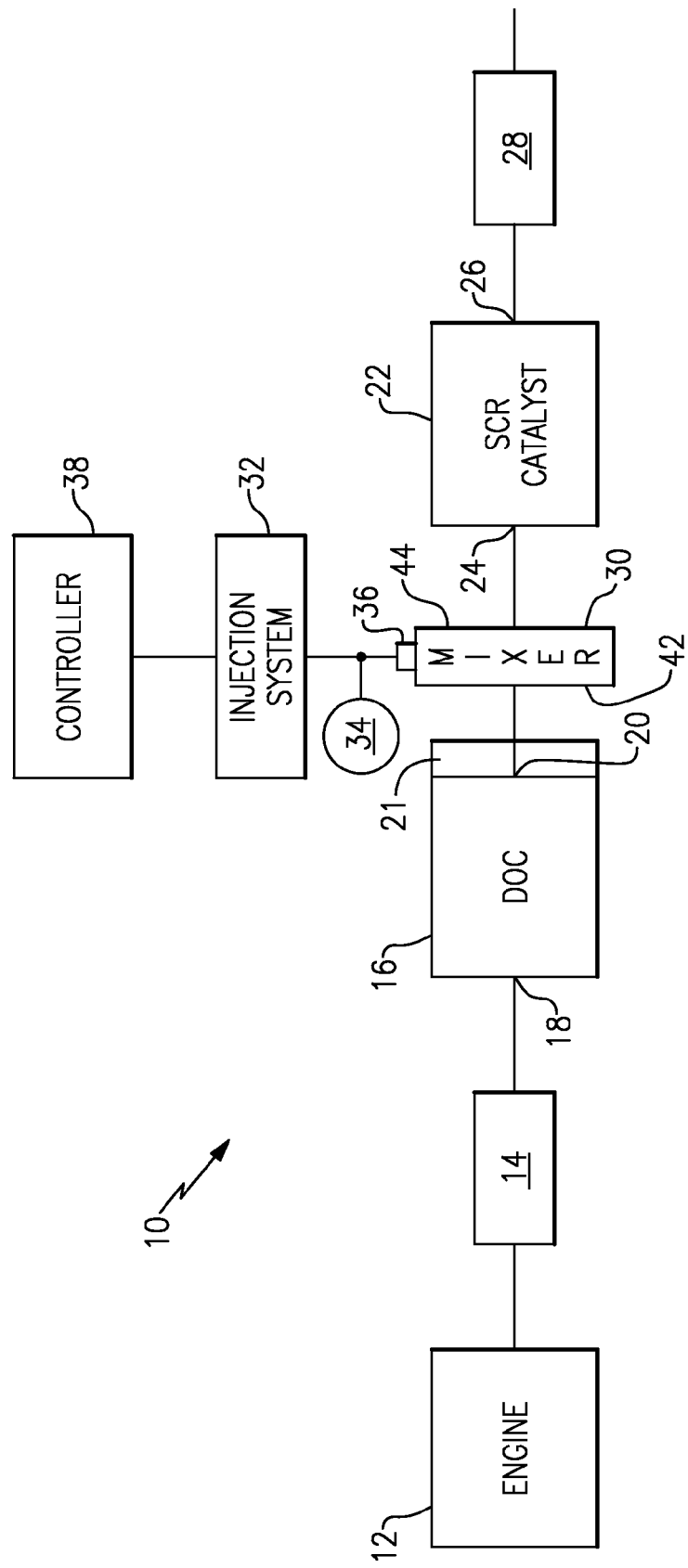
FIG. 1 schematically illustrates one example of an exhaust system with a mixer according to the subject invention.

FIG. 1 shows a vehicle exhaust system 10 that conducts hot exhaust gases generated by an engine 12 through various upstream exhaust components 14 to reduce emission and control noise as known. The various upstream exhaust components 14 can include one or more of the following: pipes, filters, valves, catalysts, mufflers etc.

In one example configuration, the upstream exhaust components 14 direct exhaust gases into a diesel oxidation catalyst (DOC) 16 having an inlet 18 and an outlet 20. Downstream of the DOC 16 is an optional component 21 that may be a diesel particulate filter (DPF), which is used to remove contaminants from the exhaust gas as known. In one example, the component 21 may be the DPF and a subsequent portion of exhaust pipe with an optional elbow type connection. In another example, the component 21 may be a portion of exhaust pipe with an optional elbow type connection. Downstream of the DOC 16 and optional component 21 is a selective catalytic reduction (SCR) catalyst 22 having an inlet 24 and an outlet 26. The outlet 26 communicates exhaust gases to downstream exhaust components 28. Optionally, component 22 can comprise a catalyst that is configured to perform a selective catalytic reduction function and a particulate filter function. The various downstream exhaust components 28 can include one or more of the following: pipes, filters, valves, catalysts, mufflers etc. These upstream 14 and downstream 28 components can be mounted in various different configurations and combinations dependent upon vehicle application and available packaging space.

A mixer 30 is positioned downstream from the outlet 20 of the DOC 16 or component 21 and upstream of the inlet 24 of the SCR catalyst 22. The upstream catalyst and downstream catalyst can be in-line, in parallel or any other configuration. The mixer 30 (as shown in the in-line configuration) is used to generate a swirling or rotary motion of the exhaust gas. An injection system 32 is used to inject a gaseous or liquid reducing agent, such as a solution of urea and water for example, into the exhaust gas stream upstream from the SCR catalyst 22 such that the mixer 30 can mix the injected substance and exhaust gas thoroughly together. In an example, the injection system 32 includes a fluid supply 34, a doser 36, and a controller 38 that controls injection of the reducing agent as known. Optionally, component 36 can be a pipe of introduction of gaseous reducing agent. Operation of the controller 38 to control injection of the reducing agent is known and will not be discussed in further detail.

The mixer 30 is shown in greater detail in FIGS. 2-9. As shown in FIG. 2A-2B, the mixer 30 comprises a mixer body having an inlet end 42 configured to receive the engine exhaust gases and an outlet end 44 to direct a mixture of swirling engine exhaust gas and products transformed from urea to the SCR catalyst 22. Further, the mixer body includes an upstream baffle 50 (FIG. 2A and FIG. 3) and a downstream baffle 52 (FIG. 2B and FIGS. 4A-4B) that are surrounded by an outer peripheral wall 54. The upstream baffle 50 is configured to initiate swirling of the exhaust gas flow. The mixer 30 also includes an inner peripheral surface 56 that faces inwardly toward a mixer center axis A (FIG. 2B).

The upstream baffle 50 at the inlet 42 may include a large inlet opening 60 that can receive the majority of the exhaust gas (for example, the large inlet opening 60 receives 60% of the exhaust mass flow rate), and which is configured to initiate the swirling motion. The upstream baffle 50 also includes a plurality of perforations, slots, or additional inlet openings 62 that ensure optimal homogenization of exhaust gases and reduces back pressure. The upstream baffle 50 and the plurality of inlet openings 60, 62 cooperate to initiate a swirling motion to the exhaust gas as the exhaust gas enters the inlet end 42 of the mixer 30.

The downstream baffle 52 includes a large outlet opening 64 (FIGS. 4A-4B) through which the majority of the exhaust gas exits. The downstream baffle 52 also includes a plurality of additional outlet openings 66 surrounded by lips 68 through which the exhaust gas exits. The lips 68 keep the urea inside the mixer 30 in order to increase DEF transformation and improve mixing performance. The lips 68 also generate additional turbulence to further improve mixing performance. The downstream baffle 52 comprises a helical portion 70. An axis of the helix is the center axis of the mixer represented by A (FIG. 2B) with a rim 72 formed about an outer perimeter of the helical portion 70. The rim 72 extends in an upstream direction.

Figure 2A:
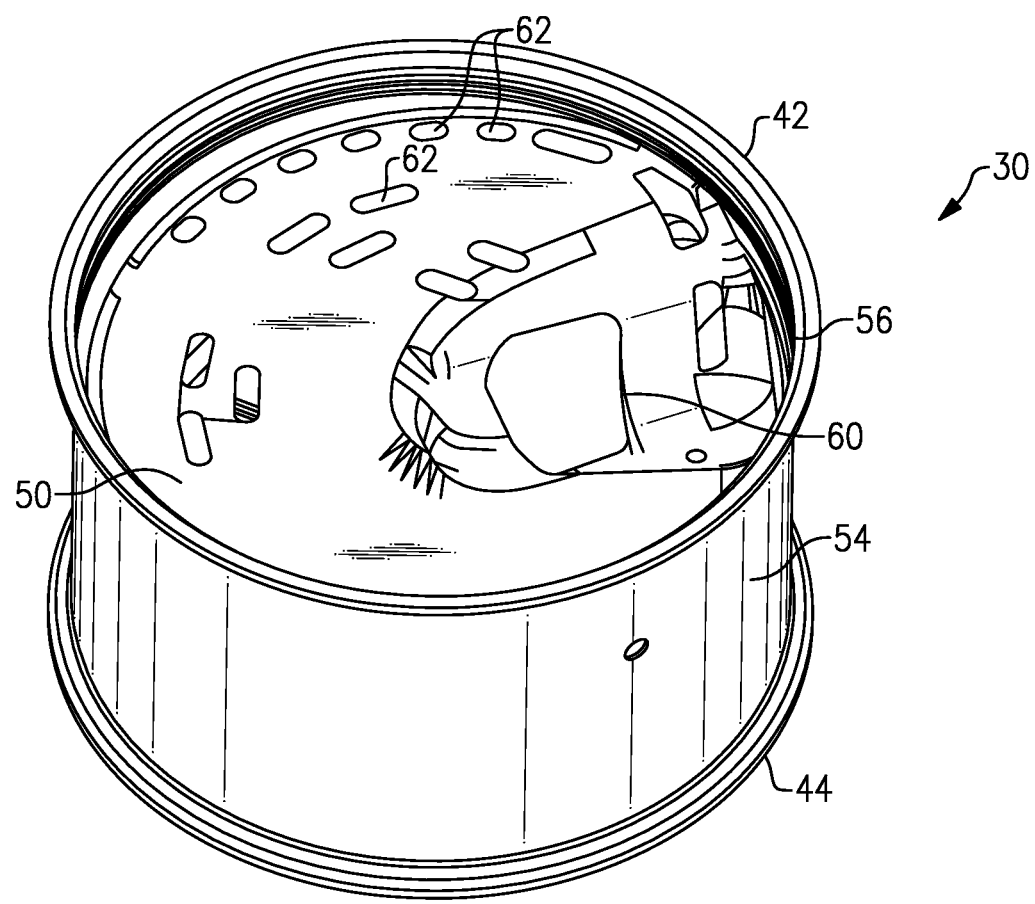
FIG. 2A is a perspective view of an upstream end of a mixer according to the subject invention.
Figure 2B:
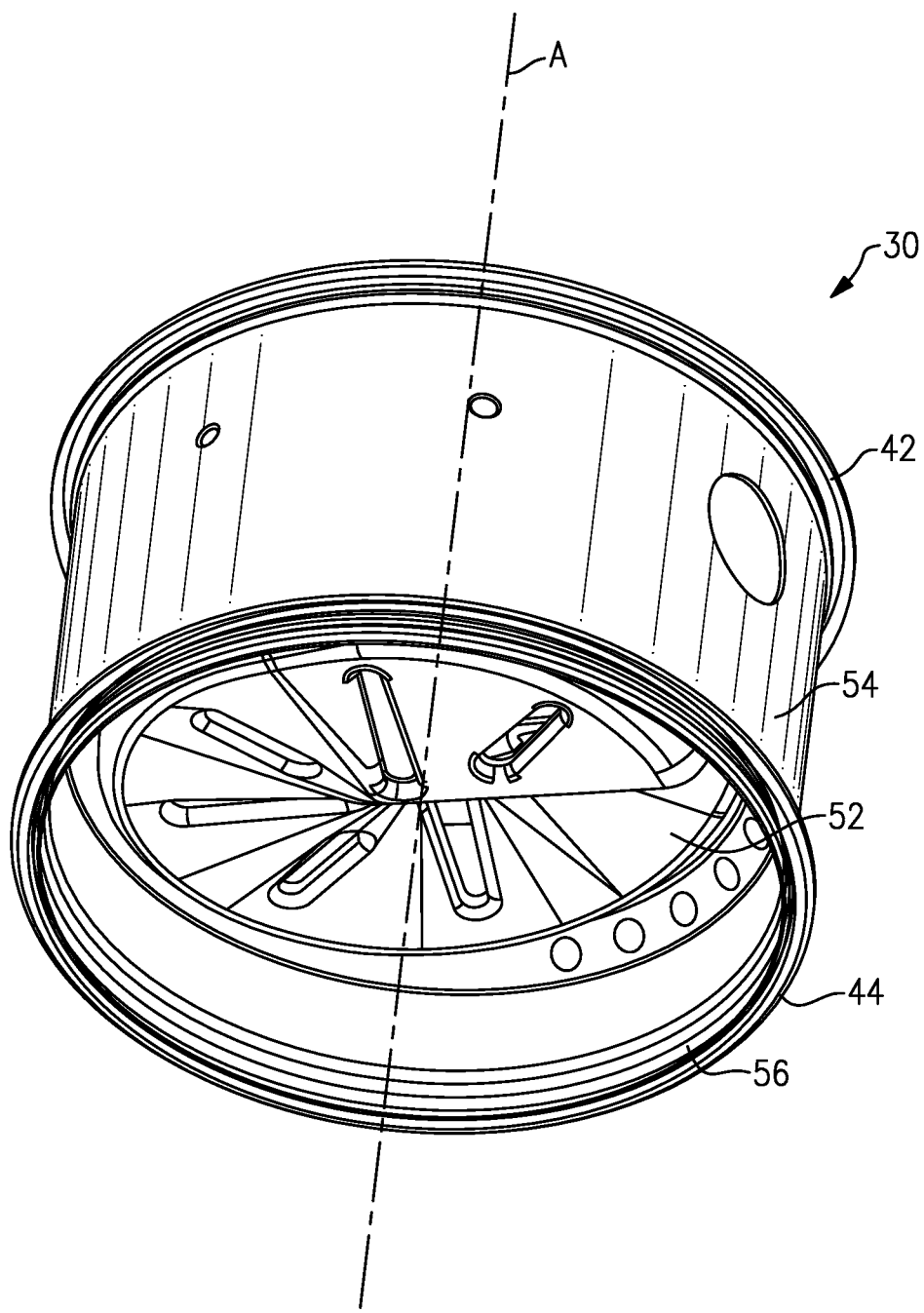
FIG. 2B is a perspective view of the mixer of FIG. 2A from a downstream end.
Figure 3:
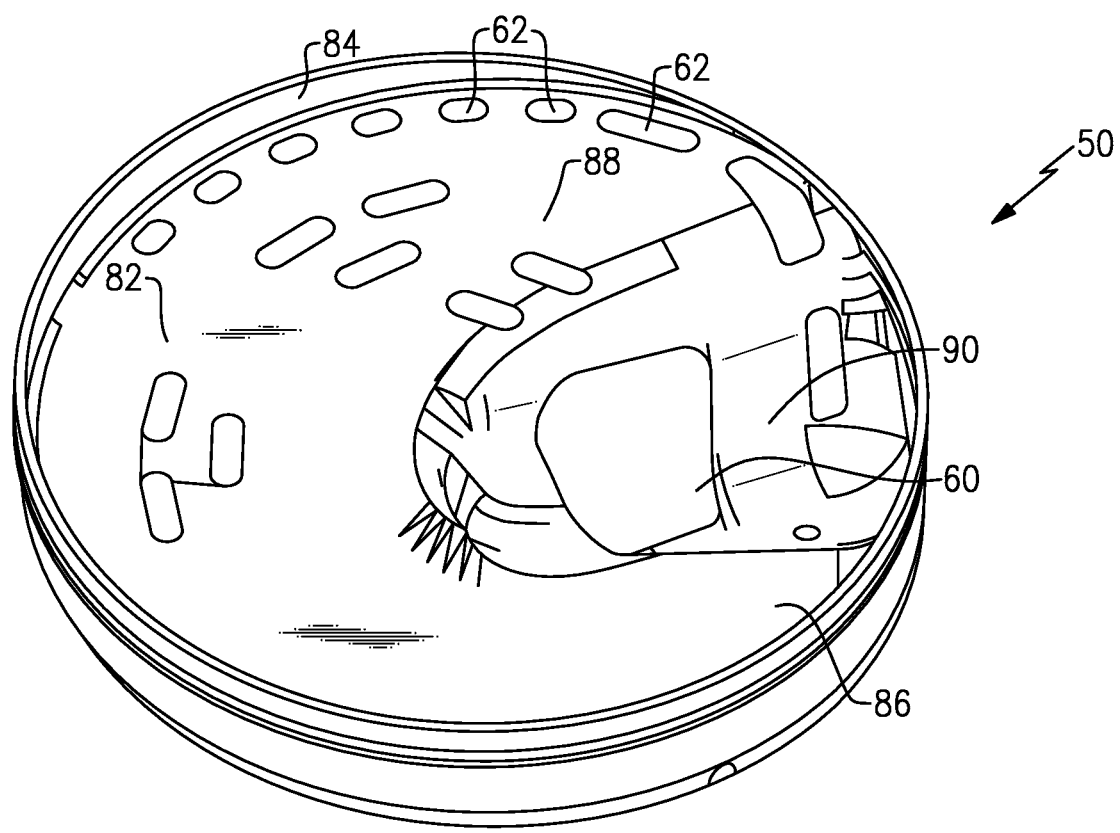
FIG. 3 is a perspective view of an upstream baffle of the mixer.
Figure 4A:
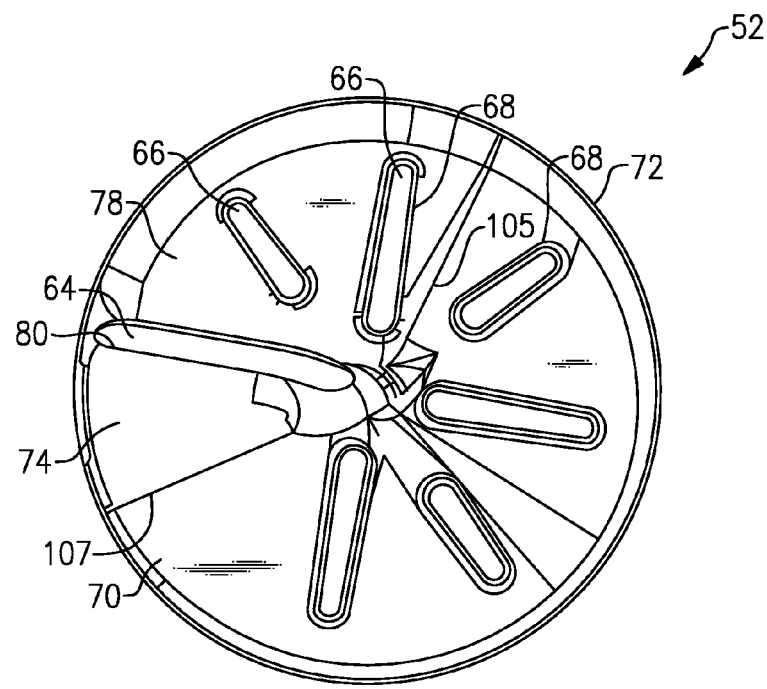
FIG. 4A is a top view of a downstream baffle of the mixer.
Figure 4B:
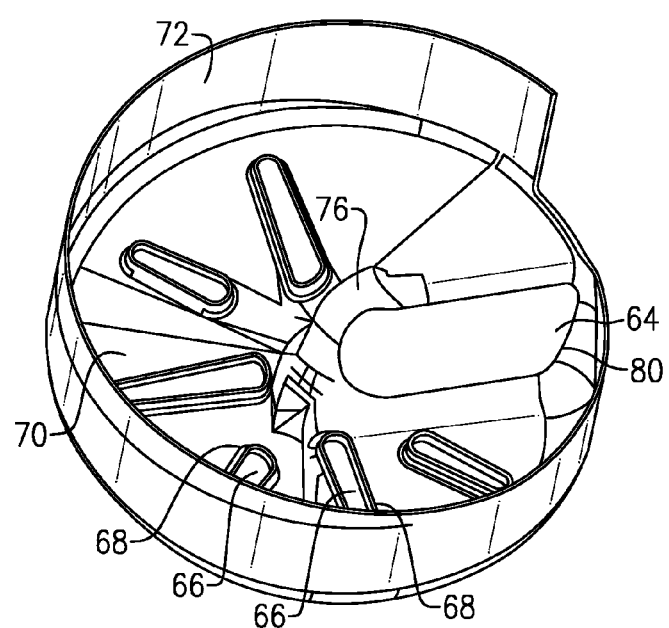
FIG. 4B is a perspective view of an upstream end face of the downstream baffle of FIG. 4A.

The large outlet opening 64 comprises a primary outlet opening and is larger than the other outlet openings 66. The helical portion 70 includes the additional outlet openings 66. The helical portion 70 is formed by an upstream end portion 74 and a downstream end portion 78. The upstream 74 and downstream 78 end portions each include a flat surface portion with the helical portion 70 extending therebetween. A transition line between the helical portion 70 and flat portion of the upstream end portion 74 is indicated at 107 in FIG. 4A. A transition line between the helical portion 70 and flat portion of the downstream end portion 78 is indicated at 105 in FIG. 4A. The flat surface portions of the end portions 74 and 78 are perpendicular to the mixer axis A (FIG. 2B). A wall 80 extends between the flat surface of the downstream end portion 78 and the flat surface of the upstream end portion 74, and the primary outlet opening 64 is formed within the wall 80. A connector ring 99 (FIG. 6) can be used to connect the baffle 52 to the wall 54 of the mixer body. Optionally, the baffle 52 could be directly attached to the wall 54.

Similarly, the upstream baffle 50 comprises a helical portion 82 with a rim 84 formed about an outer perimeter of the helical portion 82. The large inlet opening 60 comprises a primary inlet opening and may be larger than the other inlet openings 62. The helical portion 82 includes additional inlet openings 62 and has an upstream end portion 88 and a downstream end portion 86. A wall 90 extends from the upstream portion 88 to the downstream portion 86 and the primary inlet opening 60 is formed within the wall 90.

Figure 7:
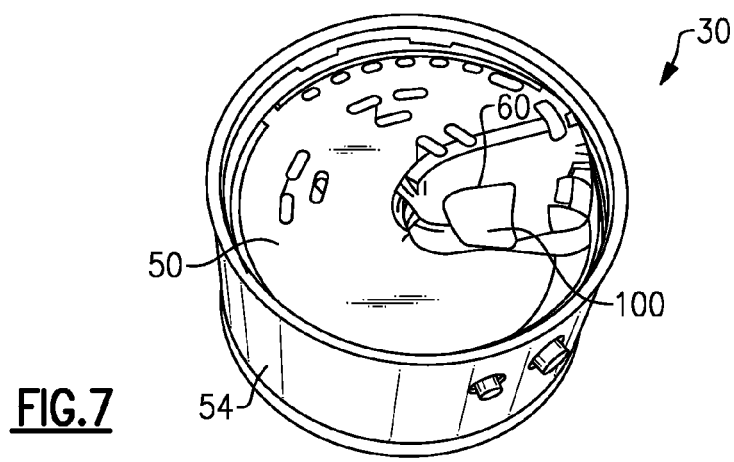
FIG. 7 is a perspective assembled view of the mixer showing the intermediate plate between the upstream and downstream baffles.

The mixer 30 includes an intermediate plate 100 (FIG. 5) positioned between the upstream 50 and downstream 52 baffles, as shown in FIG. 7, to block direct flow from the primary inlet opening 60 to the primary outlet opening 64. The intermediate plate 100 initiates a rotational flow path that directs the majority of exhaust gases exiting the primary inlet opening 60 through a rotation of more than 360 degrees about the mixer central axis A before exiting the primary outlet opening 64. In one example shown in FIG. 10, the rotation is approximately 390 degrees. In another example shown in FIG. 11, the rotation is approximately 450 degrees.

This increased degree of rotation results in more thorough mixing of the reducing agent within the exhaust gas. Also, this more thorough mixing occurs without having to increase the overall length of the mixer.

As shown in FIG. 7, the intermediate plate 100 is positioned axially between the primary inlet opening 60 and primary outlet opening 64. This prevents a short circuit path of exhaust gas directly from the primary inlet opening 60 and primary outlet opening 64. Instead, the exhaust gas enters the primary inlet opening 60 and is directed by the intermediate plate 100 to move along the rim 72 to generate the rotational mixing.

Figure 5:
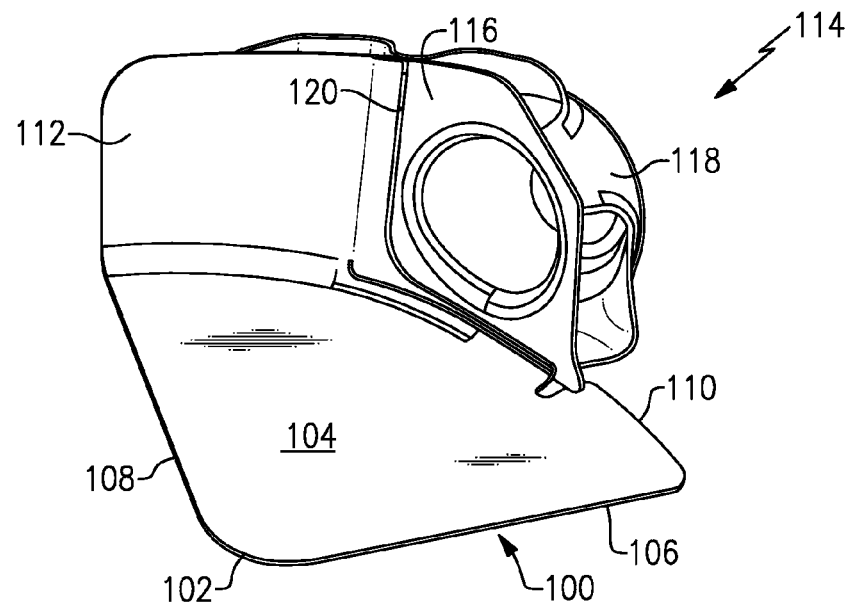
FIG. 5 is a perspective view of a sub-assembly with an intermediate plate to be included within the mixer.
Figure 6:
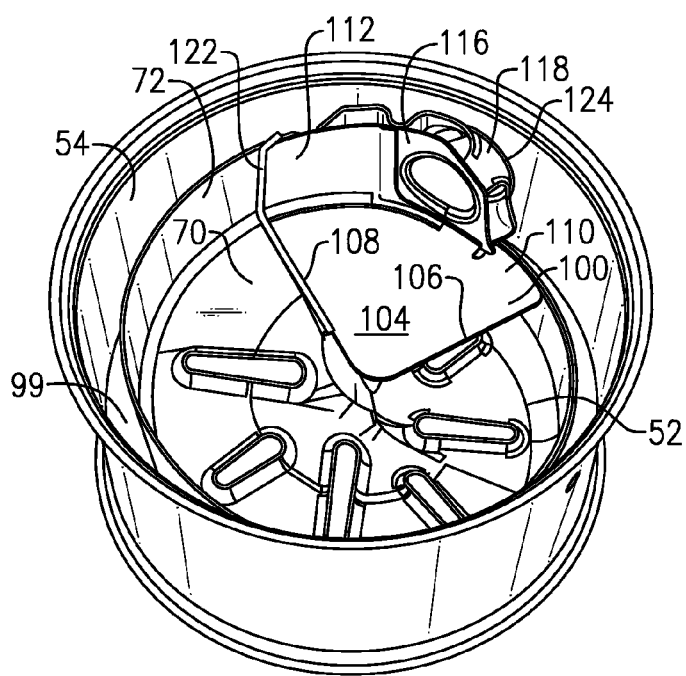
FIG. 6 is an upstream end view of the mixer showing a position of the intermediate plate and sub-assembly relative to the downstream baffle.

As shown in FIGS. 5-6, the intermediate plate 100 has an apex 102 near the mixer central axis A and which widens radially outward in a direction toward the outer peripheral wall 54. The intermediate plate 100 comprises a flat portion 104 defined by a first edge 106 extending radially outward from the apex 102, a second edge 108 extending radially outward from the apex 102 and circumferentially spaced from the first edge 106, and an outer peripheral edge 110 connecting the first 106 and second 108 edges to define a wedge-shape. The first edge 106 comprises an inlet side of the intermediate plate 100 and the second edge 108 comprises the outlet side of the intermediate plate 100. The angle defined by edge 106 and edge 108 can vary from 70 degrees to 270 degrees. The flat portion 104 can have an adjacent helical portion at the outlet side, which is the edge 108.

In one example, the intermediate plate 100 includes a flange portion 112 that extends in an upstream direction from the outer peripheral edge 110. The flange portion 112 does not extend along the entire outer peripheral edge 110. The intermediate plate 100 is attached as part of a sub-assembly 114 that additionally includes a cone plate 116 and a manifold 118 that are used to mount the doser 36 in the desired orientation position. As shown in FIG. 5, the intermediate plate 100 is attached to the cone plate 116 with a weld 120 that extends along a portion of the flange portion 112 and a portion of the outer peripheral edge 110. One or more additional welds (not shown) are used to attach the manifold 118 to the intermediate plate 100 and cone plate 116.

The sub-assembly 114 is then placed within the mixer 30 such that the flange portion 112 of the intermediate plate 100 can be welded, or otherwise attached, to the rim 72 of the downstream baffle 52 as shown at 122 in FIG. 6. Optionally, the plate 100 may not include a flange portion and the outer peripheral edge 110 could be welded to the rim.

The outer peripheral wall 54 of the mixer 30 includes a doser mount area with a doser opening 124 to receive the doser 36. The upstream and downstream baffles 50, 52 are spaced apart from each other in an axial direction along a length of the mixer 30. The doser opening 124 for the doser 36 is positioned to spray the reducing agent into an area between the upstream baffle 50 and the intermediate plate 100.

Figure 8:
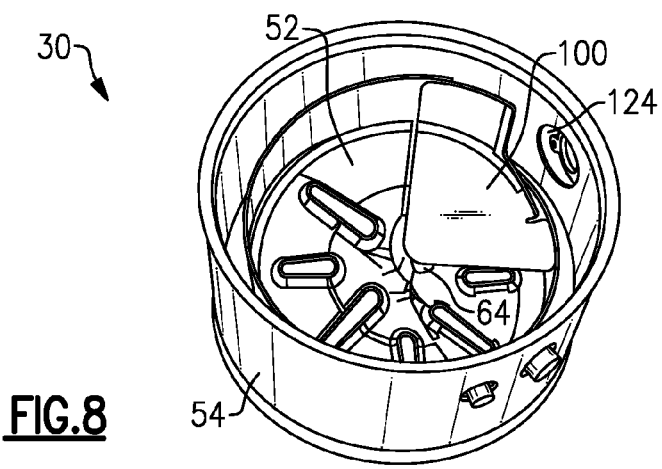
FIG. 8 is a view similar to FIG. 6 but only showing the intermediate plate.

In the example shown, the outlet side of the intermediate plate 100, i.e. the second edge 108, is aligned with the transition line 107 of the flat portion 74 of the downstream baffle 52. A weld 122 can be used to fix the second edge 108 to the transition line 107 and the flange 112 to the rim 72. Thus, the intermediate plate 100 partially overlaps the flat portion 74 and extends circumferentially beyond the primary outlet opening 64. This effectively blocks any exhaust gas entering through the primary inlet opening 60 from immediately exiting the primary outlet opening 64 (FIG. 7-8).

Figure 9:
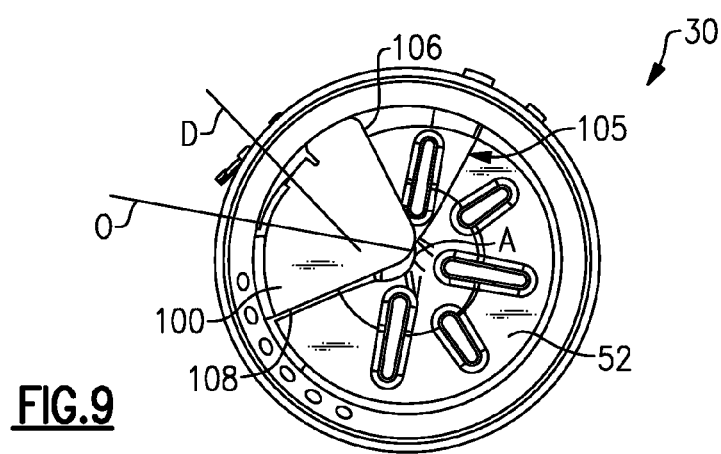
FIG. 9 is an end view showing a doser axis location in relation to the intermediate plate.
Figure 10:
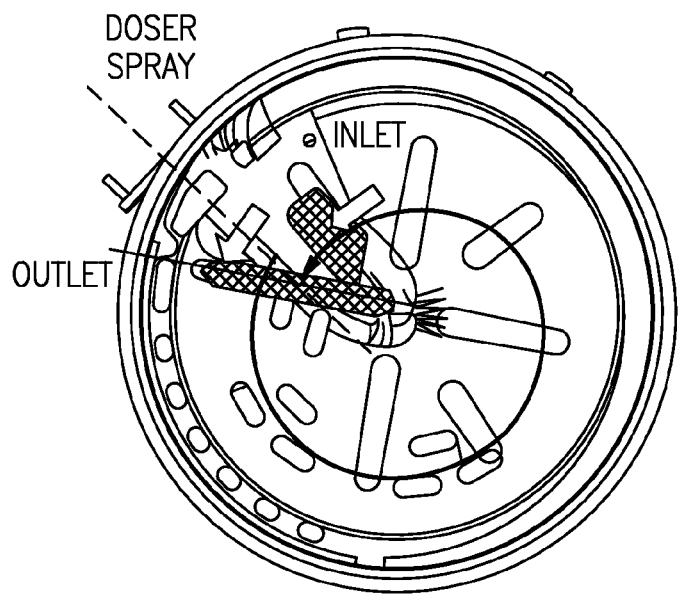
FIG. 10 is a schematic end view of the mixer showing a rotational flow path of approximately 390 degrees.

As shown in FIG. 9, the mixer 30 defines a mixer center axis A extending along a length of the mixer 30. The doser 36 defines a central doser axis D that is slightly offset relative to the center axis A of the mixer 30, i.e. axis D does not intersect axis A. The orientation of the primary outlet opening 64 is defined by axis O. From axis D to axis O, the flow can follow 390 degrees of rotation (FIG. 10).

Figure 11:
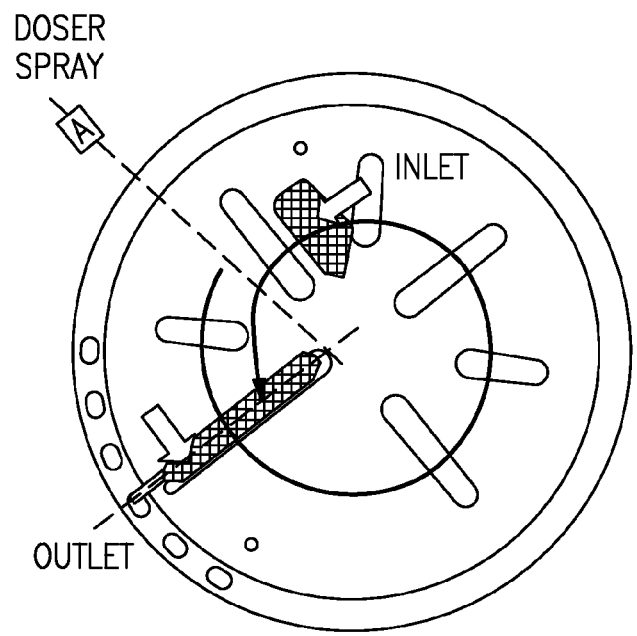
FIG. 11 is a schematic end view of the mixer showing a rotational flow path of approximately 450 degrees.

In one example embodiment, the intermediate plate 100 has the wedge-shape formed by the sides 106, 108 which are separated from each other by approximately 90 degrees. In an optional embodiment, the transition line 105 of the outlet baffle can be aligned with the inlet side 106 of the intermediate plate 100 in order to form a wedge-shape having sides 106 and 108 separated by approximately 150 degrees. This would be possible rotating the outlet baffle 52 by an additional 60 degrees resulting in a mixer having 450 degrees of rotation (FIG. 11).

The subject invention provides a compact mixer 30 that allows at least 360 degrees of flow path between axis D and axis O in order to increase mixing performance and DEF transformation. This improved performance is provided without increasing the axial length of the mixer and, further, does not adversely affect back pressure. For example, this 360 to 450 degree rotation flow path is provided within a mixer having an overall length that is between 7 and 10 inches.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A mixer for use with a vehicle exhaust system, the mixer comprising
    an annular side wall that extends circumferentially around and axially along a central axis of the mixer to define an internal region of the mixer,
    an upstream baffle including an upstream helical portion that extends circumferentially about the central axis and an axially extending inlet wall that extends between and interconnects an upstream end and a downstream end of the upstream helical portion, the axially extending inlet wall formed to include a primary inlet opening arranged to receive exhaust gases moving into the internal region during use of the mixer in a vehicle exhaust system, the primary inlet opening being radially spaced apart from the central axis to induce swirling motion of the exhaust gases about the central axis during use of the mixer,
    a downstream baffle including a downstream helical portion that extends circumferentially about the central axis and an axially extending outlet wall formed to include a primary outlet opening arranged to discharge the exhaust gases moving out of the internal region during use of the mixer, and the primary outlet opening is spaced apart circumferentially from the primary inlet opening so that the exhaust gases travel circumferentially about the central axis between the primary inlet opening and the primary outlet opening to increase mixing of the exhaust gases conducted through the mixer during use of the mixer, and
    a manifold located within the internal region of the mixer and positioned axially between the upstream baffle and the downstream baffle and the manifold is adapted to mount a doser to the mixer.

2. The mixer of claim 1, wherein the downstream baffle further includes a flat portion that is generally perpendicular to the central axis and the axially extending outlet wall interconnects the flat portion and the downstream helical portion.

3. The mixer of claim 2, wherein the downstream helical portion includes a plurality of lips that protrude axially toward the upstream baffle, the lips are spaced apart circumferentially from one another about the central axis, and each lip is formed to define an elongated secondary outlet opening that extends axially through the downstream helical portion and radially outward relative to the central axis.

4. The mixer of claim 2, wherein the downstream baffle further includes a rim that extends circumferentially along the downstream helical portion, the rim extends axially upward away from the downstream helical portion toward the upstream baffle, and at least a portion of the rim is spaced apart from the annular side wall.

5. The mixer of claim 1, wherein the manifold is arranged to direct fluid into the internal region along a doser axis that extends radially inwardly without intersecting the central axis.

6. The mixer of claim 1, wherein the annular side wall is formed to include a doser aperture, the manifold is aligned with the doser aperture, and the manifold is arranged to direct fluid into the internal region along a doser axis that extends radially inwardly without intersecting the central axis.

7. The mixer of claim 6, wherein the axially extending outlet wall is spaced apart circumferentially from the doser axis in a range from 30 degrees to 90 degrees.

8. The mixer of claim 1, wherein the upstream helical portion is formed to include a plurality of secondary inlet openings that extend axially through the upstream helical portion and the primary inlet opening is larger than each of the secondary inlet openings.

9. The mixer of claim 8, wherein the plurality of secondary inlet openings are spaced apart circumferentially from one another adjacent the annular side wall.

10. A mixer comprising
a side wall that extends circumferentially around and axially along a central axis of the mixer to define an internal region of the mixer,
an upstream baffle including an upstream helical portion that extends circumferentially about the central axis and an axially extending inlet wall formed to include a primary inlet opening, the primary inlet opening being radially spaced apart from the central axis, and
a downstream baffle including a downstream helical portion that extends circumferentially about the central axis and an axially extending outlet wall formed to include a primary outlet opening, and
a manifold located within the internal region of the mixer and positioned axially between the upstream baffle and the downstream baffle and the manifold is arranged to direct fluid into the internal region along a doser axis that extends radially inwardly without intersecting the central axis.

11. The mixer of claim 10, wherein the downstream baffle further includes a flat portion and the generally axially extending outlet wall interconnects the flat portion and the downstream helical portion.

12. The mixer of claim 11, wherein the downstream helical portion includes a plurality of lips that protrude axially toward the upstream baffle, the lips are spaced apart circumferentially from one another about the central axis, and each lip is formed to define an elongated secondary outlet opening that extends axially through the downstream helical portion and radially outward relative to the central axis.

13. The mixer of claim 10, wherein the downstream baffle further includes a rim that extends circumferentially along the downstream helical portion, the rim extends axially upward away from the downstream helical portion toward the upstream baffle, and at least a portion of the rim is spaced apart from the side wall.

14. The mixer of claim 10, wherein the downstream baffle includes a plurality of lips that protrude axially toward the upstream baffle, the lips are spaced apart circumferentially from one another about the central axis, and each lip is formed to define an elongated secondary outlet opening that extends axially through the downstream baffle.

15. The mixer of claim 10, wherein the side wall is formed to include a doser aperture and the manifold is aligned with the doser aperture.

16. The mixer of claim 15, wherein the axially extending outlet wall is spaced apart circumferentially from the doser axis in a range from 30 degrees to 90 degrees.

17. The mixer of claim 10, wherein the upstream helical portion is formed to include a plurality of secondary inlet openings that extend axially through the upstream helical portion and the primary inlet opening is larger than each of the secondary inlet openings.

18. The mixer of claim 17, wherein the plurality of secondary inlet openings are spaced apart circumferentially relative to one another adjacent the side wall.

* * * * *